United States Patent [19]

Avelange et al.

[11] Patent Number: 5,177,807
[45] Date of Patent: Jan. 5, 1993

[54] DEVICE FOR THE ALIGNMENT OF AN OPTICAL FIBER AND AN OPTOELECTRONIC COMPONENT

[75] Inventors: Gérôme Avelange, Barbizon; Alain Tournereau, Chalette, both of France

[73] Assignee: Thomson Hybrides, Puteaux, France

[21] Appl. No.: 779,232

[22] Filed: Oct. 18, 1991

[30] Foreign Application Priority Data

Oct. 19, 1990 [FR] France .................. 90 12958

[51] Int. Cl.⁵ ........................... G02B 5/14; G02B 6/42
[52] U.S. Cl. ..................................................... 385/91
[58] Field of Search ........................... 385/88, 90, 91

[56] References Cited

U.S. PATENT DOCUMENTS 4,186,994  2/1980  Denkin et al. ........................ 385/90
4,874,217  10/1989  Janssen ................................ 385/91

FOREIGN PATENT DOCUMENTS 0100086  2/1984  European Pat. Off. .
3433717  3/1986  Fed. Rep. of Germany .
1-140105  1/1989  Japan .

OTHER PUBLICATIONS

Proceedings of the Society of Photo-Optical Instrumentation Engineers, Jan. 18–20, 1989, vol. 1043, pp. 338–343, S. Enochs, "Opto-Mechanical Packaging for Extended Temperature Performance".

Primary Examiner—Akm E. Ullah
Attorney, Agent, or Firm—Oblon, Spivak, McClelland, Maier & Neustadt

[57] ABSTRACT

The disclosure relates to the field of optical components in which a fiber is aligned on a laser, LED or similar device. The fiber is fixed into a sleeve clamped by a "keyhole" shaped clamp. The optical component is fixedly joined to a base in which a slot is parallel to the optical axis of the component. The clips of the clamp are introduced into the slot which is designed to give three degrees of liberty. When the alignment is obtained in dynamic operation, the parts are fixed by solders made by laser. The device can be applied to optical heads.

5 Claims, 1 Drawing Sheet

DEVICE FOR THE ALIGNMENT OF AN OPTICAL FIBER AND AN OPTOELECTRONIC COMPONENT

BACKGROUND OF THE INVENTION

1. Field of the Invention

The present invention relates to a device for the alignment and fastening of an optical fiber and an active optoelectronic component. It also concerns the method of alignment of this device.

The optoelectronic components involved with the invention are those of the semiconductor type, such as lasers, electroluminescent diodes, photodiodes or phototransistors for example. It is known that, to associate these components with an optical fiber, it is necessary to align the optical axis of the fiber on the optical axis of the component with very high precision: for example, with a laser, the alignment should be done to within one micron or with even greater precision.

2. Description of the Prior Art

Generally speaking, there are two methods that can be used to align an optical fiber on an optoelectronic component. The first method consists of shifting the fiber within a drop of a solidifiable product placed so as to face the component. This product is either a drop of molten soft solder or a drop of glue that can be polymerized by a flash of light. During a process of dynamic adjusting, the drop is solidified when the optimum degree of coupling is achieved. The drawback of this method is that, during the solidification of the drop, the forces of contraction shift the fiber and sometimes shear it.

In the second method, the component is fixed to a first support and the fiber to a second support. These two supports have two common plane surfaces that are orthogonal to each other. Shifting the first support in relation to the second support along a first plane enables adjustments to be made in two directions of space: let us call them x and y. Then, shifting two supports in a second plane enables adjustments to be made in the third direction which is z. The drawback of this method is that it calls for two sliding systems, namely four plane surfaces machined to a precision of greater than one micron. The geometry of the supports and their machining makes the method costly. As a result, the device in which an optical fiber is aligned on a component by this second method is also costly.

SUMMARY OF THE INVENTION

The device and the method according to the invention avoid the drawbacks of the two prior art methods. All that is used in the product is one simple part, formed without precision, to hold the fiber, and a slot in the support of the component, said slot cooperating with said part. The alignment method consists of introducing the part into the slot and shifting it or inclining it until the alignment is obtained. At the optimum positioning of the fiber with respect to the semiconductor device, the position of the part is fixed by power laser soldering.

More precisely, the invention consists of a device for the alignment and fastening together of an optical fiber and an optoelectronic component fixed to a base, the fiber being passed through a metal sleeve, wherein the sleeve is gripped in a metal clamp shaped like a hairpin or keyhole which is itself gripped in a slot made in the base, in parallel to the optical axis of the component, and soldered to the slot.

DETAILED DESCRIPTION OF THE INVENTION

Figure 1:
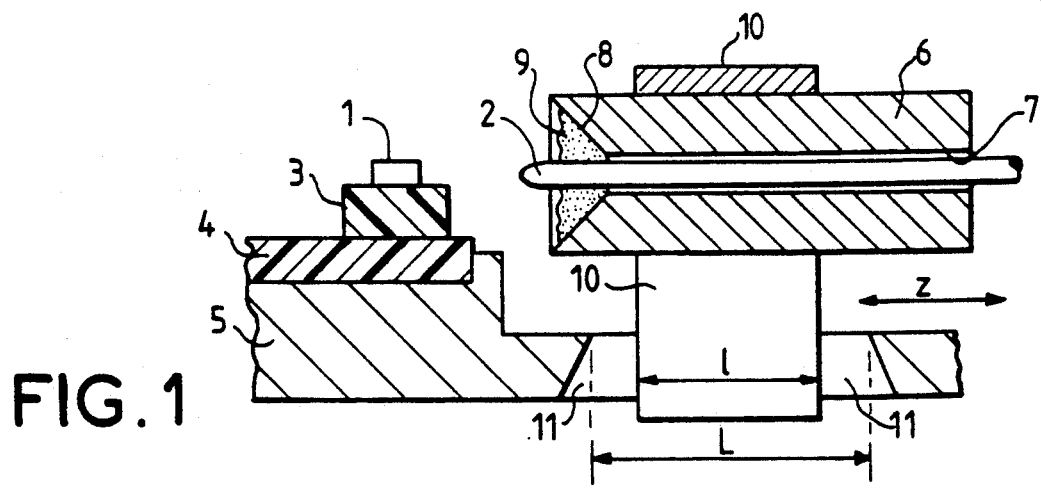
FIG. 1 shows a side view illustration of the device of the present invention in cross-section.

FIG. 1 shows a longitudinal sectional view that will be used to describe both the problem and its solution. The invention shall be explained with reference to a laser, but this does not in any way restrict the scope of the invention which includes other types of optical couplings.

An optoelectronic device, such as an optical head, essentially comprises a laser 1 and an optical fiber 2. The laser is fixed to a pedestal 3 which rests on an insulator 4, on the surface of a metal base 5. The optical fiber 2 is advantageously provided with a handling sleeve, in accordance with the French patent application No. 89 14771, filed on Nov. 10, 1989 by the present applicant. This is a metallic capillary sleeve 6, pierced longitudinally with a hole 7, the diameter of which is greater than the diameter of the fiber 2, and one end of which is bevelled at 8. The fiber 2 easily enters the capillary sleeve 6, and is immobilized by a plug of glass compound 9. The advantage of this sleeve is that it does not require the capillary tube to be very precisely machined, and does not require the adjustments to be carried over to the positioning of the sleeve since it is linked to the fiber. The problem of the alignment of the optical fiber 2 on the optical axis of the laser 1 is therefore reduced to that of the positioning of the sleeve 6 in relation to the optical axis of the laser 1.

The device according to the invention has only two means to be put into operation.

Figure 2:
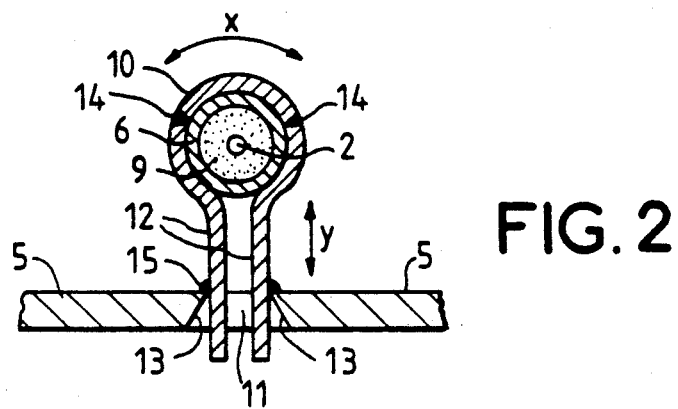
FIG. 2 shows a rear view of the embodiment of FIG. 1.
Figure 3:
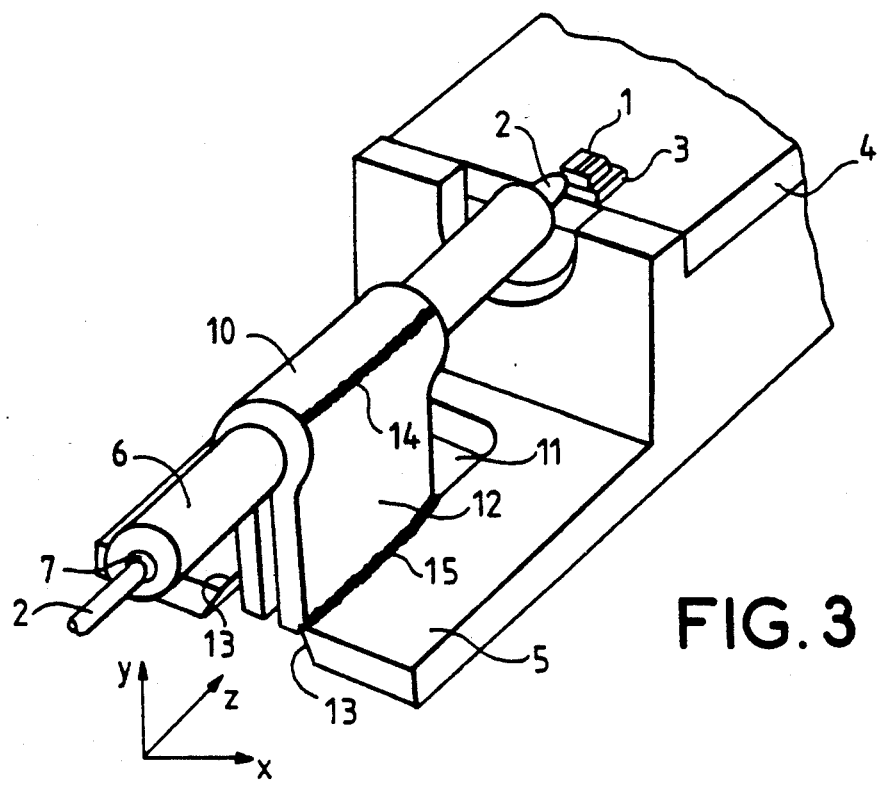
FIG. 3 illustrates the three directions of motion in which the optical fiber can be moved within the slot.

The first means, fixedly joined to the fiber 2, is a part designed to hold the sleeve 6 and position it along the optical axis of the laser 1. This is a very simple means: it is a metal strip folded to give a clamp 10 shaped like a hairpin or keyhole. The shape of this clamp 10 can be seen more clearly in FIGS. 2 and 3. The second means, fixedly joined to the laser 1, is a slot 11 made in the metal base 5, parallel to the optical axis of the laser 1. This slot has a length "L" that is slightly greater than the width "l" of the clamp 10, so that this clamp 10 can be shifted when it is introduced into the slot 11.

The clamp 10 is formed around the sleeve 6 (see FIG. 6) so as to grip it, but its shape is such that it exhibits a certain degree of elasticity: its clips 12 are folded, at the height of the sleeve 6, so as to rest with a spring effect against the bevelled edges 13 of the slot 11, thus enabling the fiber 2 and its sleeve 6 to be held in position, pending permanent fixing by soldering.

The fiber-sleeve-clamp assembly has three degrees of liberty: along an axis "z" by sliding along the slot 11, along the axis "y" by penetration into the slot, and along the axis "x" by the rotation of the clamp 10 in being supported on the bevelled edges 13 of the slot 11.

The method of alignment of the fiber on the optoelectronic component is dynamic, i.e. the adjusting operations are guided by the results of the device in operation.

Since the laser is considered to be a fixed reference point, the fiber is manipulated by means of a micromanipulator (which is not shown herein) which grips the clamp 10. By the sliding of the clamp 10 along the slot 11, and then by translation perpendicularly to the same slot and simultaneously by rotation about the bevelled edges 13, the optimum coupling point is quickly determined. The position of the fiber 2 in relation to the clamp 10 is fixed by a solder bead 14 or by some spots of solder, made by means of a power laser, of the YAG type for example.

After this first laser firing operation, it is preferable to ascertain that the optical setting has not deteriorated, for example through the expansion of the parts. When the setting has been obtained, or restored, the clamp 10 is fixed to the base 5 by means of one or two solder beads 15 along the bevelled edges 13.

It is quite clear that the order of the operations can be reversed.

As a non-restrictive example, the metal parts present are made of an alloy that undergoes little deformation under temperature: FeNi or FeNiCo. The sleeve 6 has a diameter of 1.5 mm: it is gripped in the clamp 10 which has a height of 5 mm and a width of 3 mm. The slot 11 has comparable dimensions: it is 8 mm long and 2 mm wide.

What is claimed is:

1. An alignment and fastening device for connecting an optical fiber to an optoelectronic component, said optical fiber having an optical axis, comprising:

a base member to which said optoelectronic component is fixed, said base member having a slot formed therein in a direction parallel to said optical axis;

a metal sleeve through which said optical fiber is passed; and a metal clamp in the shape of a hairpin or keyhole, wherein said metal clamp is movable within said slot in x, y and z directions, said x direction being a rotational arc direction having an axis of rotation parallel to the optical axis of said optical fiber, said y direction being a linear direction perpendicular to the optical axis of said optical fiber, and said z direction being a direction in which the optical axis of said optical fiber extends.

2. An alignment and fastening device according to claim 1, wherein said clamp has a pair of clip elements, such that said clamp is supported in the slot by means of spring-like engagement of the clip elements with opposite edges of the slot.

3. An alignment and fastening device according to claim 2, wherein the slot has a length which is greater than a distance between said clip elements so as to enable the clamp to slide in the z direction within the slot.

4. An alignment and fastening device according to claim 1, wherein the slot has beveled edges.

5. An alignment and fastening device according to claim 1, wherein first and second solder beads are used to solder the clamp to the sleeve and the base, respectively, wherein soldering of the clamp to the sleeve is performed prior to soldering of the clamp to the base.

* * * * *